(12) United States Patent
Song et al.

(10) Patent No.: US 6,501,508 B1
(45) Date of Patent: Dec. 31, 2002

(54) VIDEO FORMAT CONVERTER FOR DIGITAL RECEIVING SYSTEM

(75) Inventors: Seung Chul Song, Seoul (KR); Dong Il Han, Seoul (KR); Jin Ho Ahn, Kyonggi-do (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/475,132

(22) Filed: Dec. 30, 1999

(30) Foreign Application Priority Data

Dec. 31, 1998 (KR) ............................. 98-62824

(51) Int. Cl.$^7$ ................................. H04N 7/01
(52) U.S. Cl. ................... 348/441; 348/443; 348/445; 348/715; 348/725
(58) Field of Search ................. 348/441, 443, 348/445, 454, 458, 555, 556, 705, 706, 714, 715, 725; 382/298, 299, 300; H04N 7/01

(56) References Cited

U.S. PATENT DOCUMENTS

| | | | | |
|---|---|---|---|---|
| 5,485,216 A | * | 1/1996 | Lee | ............................. 348/443 |
| 6,025,883 A | * | 2/2000 | Jun | ............................. 348/458 |
| 6,144,412 A | * | 11/2000 | Hirano et al. | ................ 348/441 |
| 6,147,712 A | * | 11/2000 | Shimamoto et al. | ........ 348/446 |
| 6,256,068 B1 | * | 7/2001 | Takada et al. | .............. 348/441 |
| 6,353,460 B1 | * | 3/2002 | Sokawa et al. | ............. 348/555 |

* cited by examiner

*Primary Examiner*—John Miller
*Assistant Examiner*—Jean W. Désir
(74) *Attorney, Agent, or Firm*—Birch, Stewart, Kolasch & Birch, LLP

(57) ABSTRACT

A vertical video format converter is disclosed including a memory unit which consists of a plurality of line memories to store input video data in one of the line memories, a filter for multiplying video data items respectively output from line memories by coefficients input into corresponding video data item positions and adding the multiplied data items to output filtered data. In the present invention, the position of the filter center value is not fixed, but can be located arbitrarily and the filter coefficients need not be symmetrical. Moreover, an interpolation may be performed by one-time filtering, resulting in faster data processing.

20 Claims, 5 Drawing Sheets

US 6,501,508 B1

VIDEO FORMAT CONVERTER FOR DIGITAL RECEIVING SYSTEM

BACKGROUND OF THE INVENTION

1. Field of the Invention

The present invention relates to a digital receiver and more particularly to an apparatus for converting the size of an input image in compliance with an output format of a digital TV.

2. Discussion of Related Art

A digital TV receives images of various types and sizes. Thus, a digital TV requires a format converter which converts the type and size of images in compliance with the format of the display device. Particularly when the input video format is of a high definition grade but the display format is of a standard definition grade, a vertical and horizontal filtering is required. For example, when the input video format has 1,920 pixels×1,080 lines and the display format has 720 pixels×480 lines, the input video must be filtered in the vertical and horizontal directions.

FIG. 1 is a block diagram of a digital receiving system in the related art including a format converter. Referring to FIG. 1, a tuner 102 selects a channel from a plurality of channels received through an antenna 101 and outputs the selected channel to a demultiplexer 103. The demultiplexer 103 selects a desired program from a plurality of programs included in the channel and divides the selected program into audio and video bit stream packets. The divided video bit stream is output to a video decoder 104, which removes the overhead (header information, start code, etc.) from the video bit stream and variable-length-decodes the data information. The video decoder 104 also inverse quantizes, inverse discrete cosine transforms and using motion vectors for the decoded data information, motion compensates the data information to restore the pixel values of the original picture. The restored picture is then output to a format converter 105. The format converter 105 converts the input video format to conform to the display format if the two formats are different, and outputs the received picture for display.

FIG. 2 is a block diagram of a format converter for performing video format conversion in the vertical direction. The input video data is received through an input buffer 201 and stored in the first line memory of a memory 202. One line memory is capable of storing the amount of data corresponding to one line of input video data, and the number of line memories of memory 202 is equal to the number of taps in a filter 206. The line memories of memory 202 have a first-in-first-out (FIFO) structure. Thus, when data is read, the previous data is output from a line memory and input to the next line memory. The vertical format conversion for the video data will be explained below.

One address of a line memory may store data by one byte or by eight bytes. If the data is stored by eight bytes, a P2S unit 203 is required to convert the eight-byte data into a byte unit which can be filtered by the filter 206. Each P2S of P2S unit 203 is a kind of multiplexer that converts the data of eight bytes output in parallel from each line memory into data of one byte. The one-byte data which passed through the P2S unit 203 enters the filter 206. The filter 206 multiplies the input video data items {I0, I1, ..., In} by filter coefficients {C0, C1, ..., Cn}, respectively, and adds the multiplied data items, as represented by Equation (1) below, where n is an odd number.

$$OUT=(I0 \times C0)+(I1 \times C1)+, \ldots ,+(Icenter \times Ccenter)+, \ldots ,+(In \times C(i))$$

The coefficients of the filter 206 are previously stored in a filter coefficient table 204. Accordingly, the coefficients required for a current format conversion are selected under the control of a controller 200, and are loaded on the filter 206 through a buffer 205. For example, when the filter 205 has five taps, five line memories of memory 202 are required.

Referring to FIG. 3A~3C, when the input video data items are vertically decimated by half, data items {D2, D4, D6, ...} become the input center values (Icenter) of filter 206. Also, the data items corresponding to lines D0~D4 are stored sequentially from the lowest line memory due to the line shift of the input data, as shown in FIG. 3B, and are output to the filter 206. The locations of the input center values (Icenter) and the coefficient center value (Ccenter) of filter 206 are fixed. Particularly, the coefficient center value and the input center values must be input respectively through the Ccenter and Icenter at all times. Moreover, the filter coefficients are symmetrical with respect to the Ccenter. Accordingly, the center value of input data item D2 is input into Icenter of filter 206 to be multiplied by the coefficient center value C2.

Typically, the coefficient center value Ccenter is given the largest value among the coefficient values input into the filter 206. FIG. 3B shows an example in which the coefficient center value C2 is 0.4, the coefficient values C1 and C3 on either sides of coefficient center value C2 is 0.2, and the outermost coefficient values C1 and C4 is 0.1. Thus, the filter coefficient serves as a kind of weight and the output of the filter 206 becomes as follows.

$$OUT=D0C0+D1C1+D2C2+D3C3+D4C4=0.1D0+0.2D1+0.4D2+0.3D3+0.1D4.$$

As the data items corresponding to lines D0~D4 are output to the filter 206, the data items corresponding to lines D2~D6 are stored sequentially from the lowest line memory of memory 202, as shown in FIG. 3C, and are output to filter 206. The center value of the input data item D4 is input into Icenter of filter 206 to be multiplied by the coefficient center value C2 (=0.4). Thus, the output of filter 206 becomes 0.1D2+0.2D3+0.4D4+0.2D5+0.1D6. According to the aforementioned process, the number of lines of the video data output from the input buffer 201 is reduced by half as they pass through the filter 206.

A line memory 207 connected to the output port of the filter 206 is used when the output video data is extracted between lines of video, i.e. when interpolation is needed. For example, if 1080 lines are converted into 480 lines, the filter 206 first converts the 1080 lines into 540 lines through the ½ down-filtering. Thereafter, the 540 lines are converted into 480 lines by interpolation because 540 is not a multiple of 480. Thus, when interpolation is required, the filtered result of the first video line is stored in the line memory 207 until the filtered result of the second video line is output from the filter 206. An interpolation unit 208 then interpolates the filtered result of the first line stored in line memory 207 and the filtered result of the second video line output by the filter 206.

In other words, the video data that was filtered by the filter 206 is either stored in the line memory 207 according to the format conversion and be interpolated with the filtered result of the next video line data, or output without interpolation by bypassing the line memory 207.

As shown in FIG. 4, for example, when the output data must be extracted from a position (1) between video data items D3 and D4, i.e. the middle of the two lines D3 and D4, the video data items D1~D5 are first filtered by filter 206 and stored in the line memory 207. The filtered result of the video data items D1~D5 is represented by Equation (2) below.

$$\text{OUT } (D1{\sim}D5) = D1C0 + D2C1 + D3C2 + D4C3 + D5C4 \quad (2)$$

Thereafter, the filter 206 filters video data items D2~D6 and outputs the filtered result to the interpolation unit 207. The filtered result of video data items D2~D6 is represented by the Equation (3) below.

$$\text{OUT } (D2{\sim}D6) = D2C0 + D3C1 + D4C2 + D5C3 + D6C4 \quad (3)$$

The interpolation unit 208 receives the filtered result of data D1~D5 stored in the line memory 207 and the filtered result of data D2~D6 output directly from the filter 206, and interpolates the two filtered results, which can be represented by Equation (4).

$$\text{OUT} = [\text{Equation (2)} + \text{Equation (3)}]/2 = [(D1C0 + D2C1 + D3C2 + D4C3 + D5C4) + (D2C0 + D3C1 + D4C2 + D5C3 + D6C4)]/2 \quad (4)$$

Particularly, Equation (2) is the filtered result using D3 as the center value and Equation (3) is the filtered result using D4 as the center value. Also, C2 becomes the filter coefficient center value while the other coefficients are symmetrical with respect to C2 as the center. The value obtained in the interpolation unit 208 by adding the result of Equation (2) to the result of Equation (3) and averaging the sum becomes the desired output data.

However, when the desired output data is located at a position (2) between D3 and D4, as shown in FIG. 4, and not at the middle of the D3 and D4, the interpolation unit 208 assigns weights '3' to Equation (2) and '1' to Equation (3), and obtains a weighted average by multiplying the sum with ¼. This can be represented by Equation (5).

$$\text{OUT} = [3\text{Equation (2)} + \text{Equation (3)}]/4 = [3(D1C0 + D2C1 + D3C2 + D4C3 + D5C4) + (D2C0 + D3C1 + D4C2 + D5C3 + D6C4)]/4 \quad (5)$$

In the conventional vertical video format converter of FIG. 2 as described above, the locations of the input center value Icenter and the coefficient center value Ccenter of filter 206 are fixed. Thus, the coefficient center value and the input video data center value must be input respectively through the Ccenter and Icenter, at all times. This restricts the filter coefficients to achieve symmetry with respect to the Ccenter as the center. Accordingly, the format conversion in various modes become difficult because of the restriction. Moreover, a line memory and an interpolation unit must be connected to the output port of the filter when interpolation is required.

SUMMARY OF THE INVENTION

Accordingly, an object of the present invention is to solve at least the problems and disadvantages of the related art.

An object of the present invention is to provide a vertical video format converter for supporting format conversion in various modes.

Another object of the present invention is to provide a vertical video format converter in which the center positions of input data items and the coefficients of a filter are not fixed.

A still another object of the present invention is to provide a vertical video format converter in which a filter directly interpolates the input video data.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a vertical video format converter includes a memory unit which consists of a plurality of line memories and stores input video data in one of the line memories; a filter for multiplying the video data items respectively output from the line memories by coefficients input into corresponding video data item positions, and adding the multiplied results; a filter coefficient table for previously calculating filter coefficients which vary with format conversion rates and storing the calculated values; a switch for moving the position of a filter coefficient selected from the filter coefficient table according to a format conversion rate in compliance with the center position of the video data input into the filter; and a controller for controlling the storing of data in the line memories and switching in the switch.

In a preferred embodiment of the present invention, the controller generates a control signal which indicates the line memory storing the center data item of the input video data currently being processed, and the switch moves the position of the filter coefficient output to the filter according to the control signal. The filter performs filtering for the first and second line data items to simultaneously carry out interpolation. Furthermore, the vertical video format converter of the present invention may be implemented in any digital receiving system requiring a format conversion.

BRIEF DESCRIPTION OF THE ATTACHED DRAWINGS

The invention will be described in detail with reference to the following drawings in which like reference numerals refer to like elements wherein.

Figure 1:
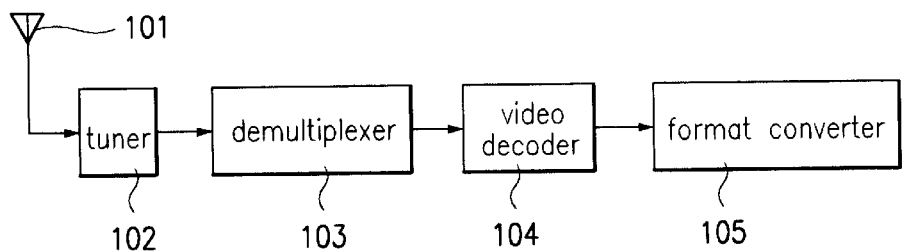
FIG. 1 is a block diagram of a digital receiving system in the related art.
Figure 2:
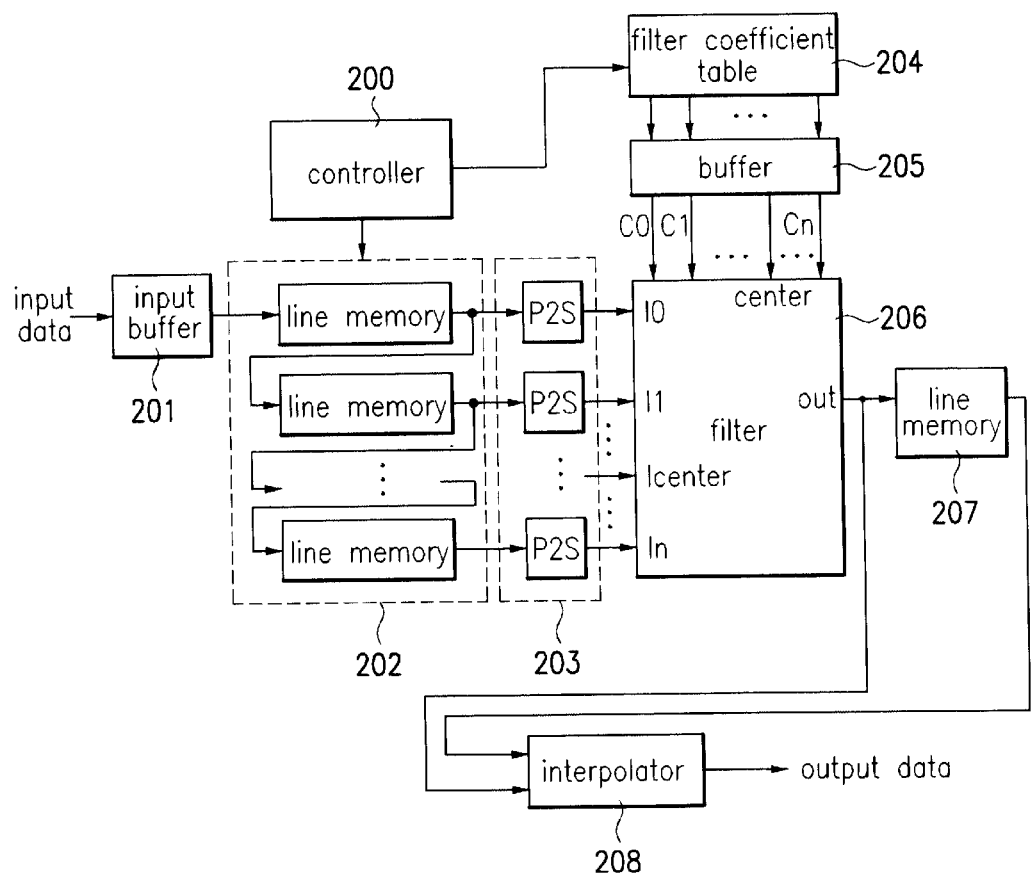
FIG. 2 is a block diagram of a vertical video format converter of FIG. 1.
Figure 3A:
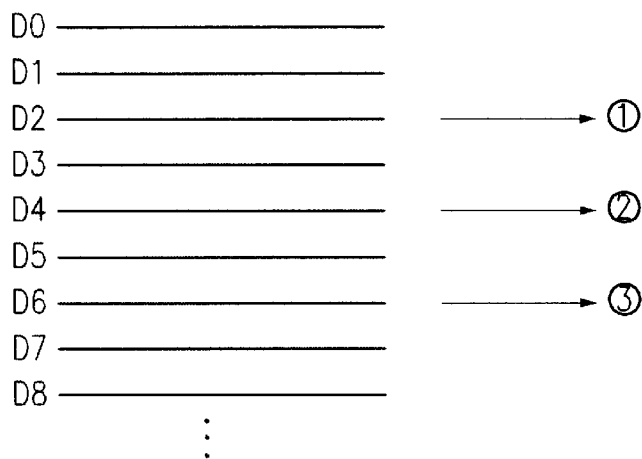
Figure 3B:
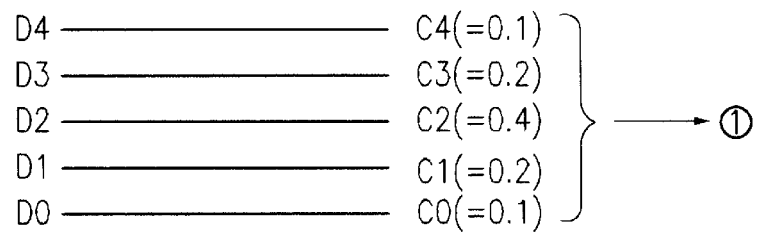
Figure 3C:
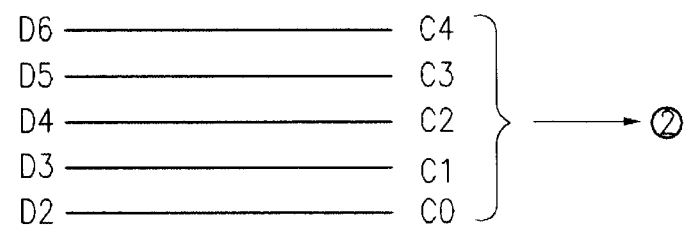
Figure 4:
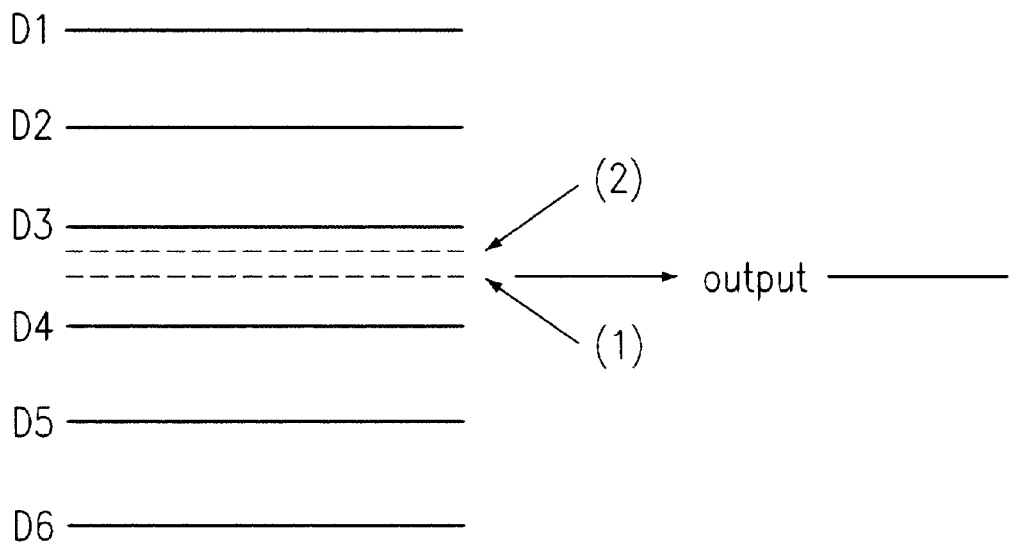
Figure 5:
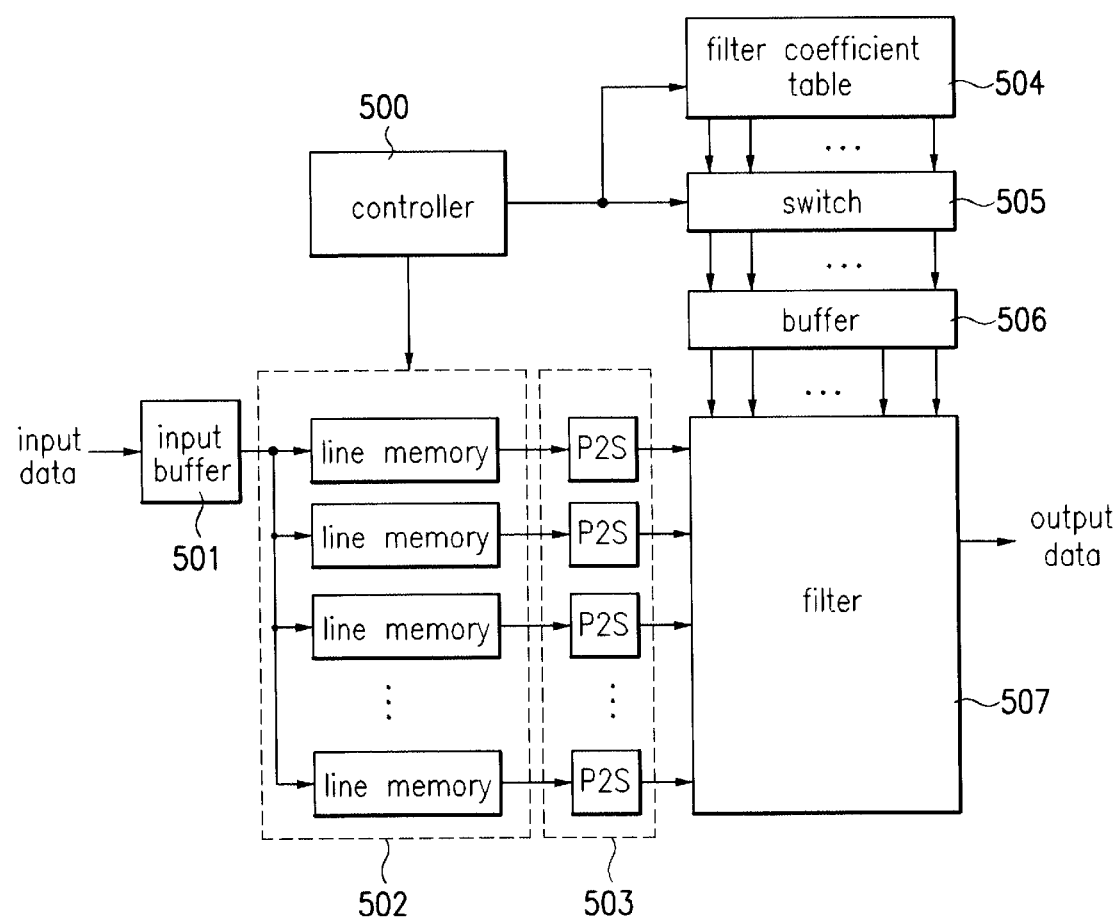
Figure 6A:
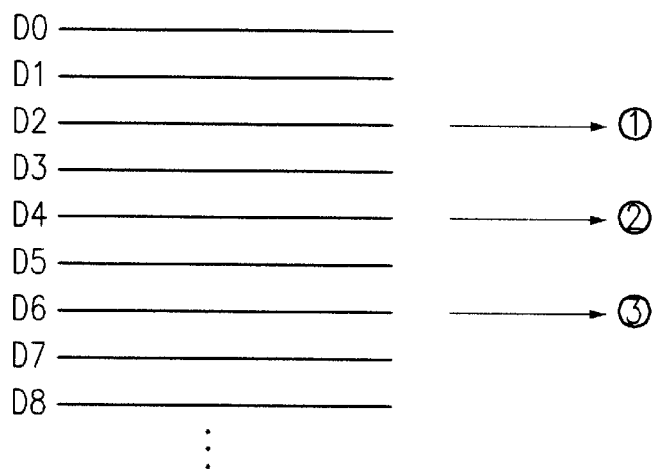
Figure 6B:
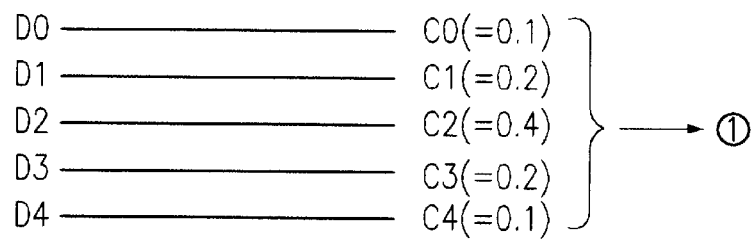
Figure 6C:
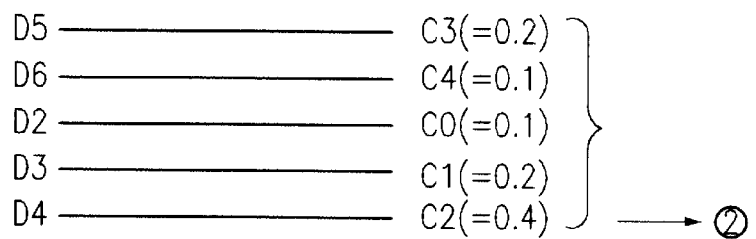

FIGS. 3A~3C show the relations between the input video data items input into a filter and the filter coefficients;

FIG. 4 shows an example of extracting data between lines;

FIG. 5 is a block diagram of a vertical video format converter according to the present invention; and FIGS. 6A~6C show the relations between the video data items input into a filter and the filter coefficients, according to the present invention.

DETAILED DESCRIPTION OF PREFERRED EMBODIMENT

Reference will now be made in detail to the preferred embodiments of the present invention, examples of which are illustrated in the accompanying drawings.

Generally, the vertical video format converter of the present invention does not fix the center positions of the input data items and the filter coefficients, thereby permitting the filter coefficients to be asymmetrical. Namely, an input data of the filter can be stored at any position of a memory and an arbitrary filter coefficient can be located at any position. By doing so, the filter can be better controlled which facilitates format conversions in various modes.

Also, when an interpolation of the input video is required, the interpolation can be carried out within the filter.

Specifically, the coefficient values of the filter are previously calculated in compliance with the necessary interpolation and are included in a filter coefficient table. These coefficient values are loaded on the filter when an interpolation is required to simultaneously perform the interpolation between two line data items through the filter. This eliminates a need for implementing a line memory and an interpolation unit as in the vertical video format converter of the related art.

FIG. 5 shows a block diagram of the vertical video format converter according to the present invention. A switch 505 is implemented between a filter coefficient table 504 and a buffer 506. The output port of an input buffer 501 is coupled in parallel to the input ports of line memories of a memory unit 502. The data output by the input buffer 501 may be stored in any one of the line memories under the control of a controller 500. The controller 500 controls the memory write address and enable signals of the line memories, to store the data output by the input buffer 501 in an arbitrary line memory.

The output data of the input buffer 501 can be stored in arbitrary line memories and the switch 505 moves the filter coefficients in accordance with the center position of the input video data. Namely, the switch 505 outputs a filter coefficient selected from the filter coefficient table 504 to an appropriate position corresponding to the input video data positions. This requires a control signal indicating the positions of the input video data including the line memory which stores the center data item of the input video data currently being processed. Therefore, a control signal is generated by the controller 500 based upon the memory write address of the line memories and the switch 505 moves the coefficient positions in the filter 507 according to the control signal.

Moreover, as in the related art, the filter coefficients required for a current format conversion are selected under the control of the controller 500. Also, a P2S unit 503 is implemented to convert, as necessary, an eight-byte data into a byte unit which can be filtered by the filter 507. The operations of the present invention will be explained below by example.

For example, if the filter 507 has five taps, the memory unit 502 requires five line memories. When the input data items shown in FIG. 6A are ½ down-filtered in the vertical direction, the data items {D2, D4, D6, ... } become the input center values of the filter 507. In the preferred embodiment, the data items D0~D4 input through the input buffer 501 are initially stored in sequence from the highest line memory, as shown in FIG. 6B, and output to the filter 507. The switch 505 reads the corresponding filter coefficients from the filter coefficient table 504 and outputs the filter coefficients to the filter 507 through the buffer 506.

Since the center value of the input data D2 would be input into the center of the filter 507, the coefficient center value C2 is input to the center for a multiplication with input data D2. Thus, the output of the filter 507 becomes (D0C0+D1C1+D2C2+D3C3+D4C4). Subsequently, data items corresponding to lines D2~D6 may be stored in the line memories of the memory unit 502, as shown in FIG. 6C, where D5 and D6 replaces D0 and D1. In such case, the center value of the input data D2 remains stored in the lowest line memory and the stored data items are directly output to the filter 507, without a change in position. Thus, the switch 505 sends the selected filter coefficients from the filter coefficient table 504 to positions corresponding to the data items with respect to the center value of the input data.

In particular, the fourth, fifth, first, second and third coefficients {C3, C4, C0, C1, C2} are sent to the filter 507 through the switch 505 to be respectively multiplied by the first, second, third, fourth and fifth input video data items {D5, D6, D2, D3, D4}. Accordingly, the center value C2 of the coefficients would be multiplied by the center data item D4, even if the data item D4 is not input through the center port of the filter 507. As a result, the positions of the input center value and the filter coefficient center value need not be fixed, and the filter coefficients need not be symmetrical with respect to the center of the filter. Here, the result of the filter 507 is the same as that of Equation (3).

When an interpolation is required, the filter 507 may simultaneously execute an interpolation of the first and second line data items. For example, the output data may be directly extracted from either position (1) or position (2) between video data items D3 and D4, as shown in FIG. 4, using data items D2~D5. This can be represented by Equation (6).

$$OUT = D2C0 + D3C1 + D4C2 + D5C3 + D6C4, \quad (6)$$

where C4=0

Namely, the data is output using only four line data items rather than using all five line data items. Here, the coefficients C0~C3 would be different from the coefficients of Equation (5).

For extracting output data from position (1), the two middle coefficients C1 and C2 become the coefficient center. In other words, the assignment of values from C0 to C3 would be symmetrical with respect to C1 and C2 as the center (C0=C3, C1=C2). When four video line data items D2~D4 are used as represented by Equation (6), new filter coefficient values should be calculated accordingly in advance to be included in the filter coefficient table 504 and the values would be loaded on the filter 507 through the switch 505 when executing the filtering of Equation (6).

The coefficient C4 has a value of '0' in order to remove the effect of the fifth line data item D6 since the filter has five taps. At this time, data items D2~D6 may be located at any positions as described above and the filter coefficients C0~C4 would be moved in accordance with the corresponding positions.

When an output data must be extracted from position (2), different filter coefficient values are calculated in advance to be included in the filter coefficient table 504 and the values would be loaded on the filter 507 through the switch 505 when executing the filtering of Equation (6). Here, the values assigned to the filter coefficients C0~C3 are not symmetrical because the output data inclines toward one of the input lines. In such case, more weight is given to the data of the line closer to the position of the output data. In the above example, the filter coefficient C2 for multiplication with D3 would be given more weight.

Moreover, the interpolation according to the present invention may be implemented using a FIFO structure in place of the memory unit 502. Although more time would be required to place the data items and the filter coefficients in fixed positions, the switch 505 can be eliminate, thereby simplifying the hardware configuration of a vertical video format converter. If a FIFO structure is utilized, the filter coefficient values would be assigned as described above and two data lines may be interpolated in the filter 507 using all five data items D2~D5 by eliminating the effect of the fifth line data item as shown in Equation (6).

As described above, according to the vertical video format converter of the present invention, the position of the filter center value is not fixed, but can be located arbitrarily and the filter coefficients need not be symmetrical. As a result, the filter efficiently controlled, thereby facilitating format conversion in various modes and improving a digital receiver system. Furthermore, a line memory and an interpolation unit required in the format converter of the related art can be eliminated to simplify the hardware configuration of the system. Finally, an interpolation may be performed by one-time filtering, resulting in faster data processing.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A vertical video format converter, comprising:

a memory unit with a plurality of line memories, said memory unit storing input video data in the plurality of line memories and outputting video data items from the plurality of line memories;

a filter coefficient table storing filter coefficients;

a switch which moves positions of filter coefficients selected from the filter coefficient table to corresponding positions of the video data items;

a filter which respectively multiplies the video data items from the memory unit by the filter coefficients input to corresponding positions of the video data items, and adds the multiplied results to output format converted data; and a controller which controls selection of the filter coefficients, the storage of the input data in the plurality of line memories and the movement of the filter coefficients by the switch, based upon a format of a display device.

2. An apparatus of claim 1, wherein the filter coefficients stored in the filter coefficient table vary with format conversion rates.

3. An apparatus of claim 1, wherein the controller generates a control signal which indicates the positions of the video data items including a line memory which stores the center data item of the input video data currently being processed, and the switch moves positions of the filter coefficients according to the control signal.

4. An apparatus of claim 1, wherein a number of the line memories of the memory unit is determined by a number of taps in the filter.

5. An apparatus of claim 1, wherein the filter multiplies the video data items by the filter coefficients to interpolate between two video data items if necessary.

6. An apparatus of claim 5, wherein the filter removes an effect of at least one video data item when multiplying the video data items by the filter coefficients to interpolate between two video data items.

7. An apparatus of claim 6, wherein the filter coefficient values for interpolation by the filter are calculated in advance and stored in the filter coefficient table.

8. An apparatus of claim 7, wherein the effect of a video data item is removed by assigning a value of '0' to a filter coefficient value corresponding to the video data item.

9. An apparatus of claim 7, wherein more weight is assigned to a video data item closer to a position of an output data when calculating the filter coefficient values if the position of an output data is not in a middle of two video data items to be interpolated.

10. A method of converting vertical video format, comprising:

(a) storing input video data in a plurality of line memories of a memory unit and outputting video data items from the plurality of line memories;

(b) storing filter coefficients in a filter coefficient table;

(c) moving positions of filter coefficients selected from the filter coefficient table to corresponding positions of the video data items;

(d) respectively multiplying the video data items from the memory unit by the filter coefficients input to corresponding positions of the video data items, and adding the multiplied results; and (e) controlling selection of the filter coefficients, the storage of the input data in the plurality of line memories and the movement of the filter coefficients, based upon a format of a display device.

11. A method of claim 10, wherein in (b) the filter coefficients stored in the filter coefficient table vary with format conversion rates.

12. A method of claim 10, wherein in (e) generating a control signal which indicates the positions of the video data items including a line memory which stores the center data item of the input video data currently being processed, and in (c) moving positions of the filter coefficients according to the control signal.

13. A method of claim 10, wherein in (d) multiplying the video data items by the filter coefficients to interpolate between two video data items if necessary.

14. A method of claim 13, wherein removing an effect of at least one video data item when multiplying the video data items by the filter coefficients to interpolate between two video data items.

15. A method of claim 14, wherein in (b) calculating filter coefficient values for interpolation in advance and storing the calculated filter coefficient values in the filter coefficient table.

16. A method of claim 15, wherein assigning a value of '0' to a filter value corresponding to a video data item to remove an effect of the video data item.

17. A method of claim 15, wherein more weight is assigned to a video data item closer to a position of an output data when calculating the filter coefficient values if the position of an output data is not in a middle of two video data items to be interpolated.

18. A digital receiving system, comprising:

a tuner which selects a channel from a plurality of channels received through an antenna and demodulates the selected channel;

a demultiplexer which selects a program from a plurality of programs included in the selected channel and divides the selected program into a video bit stream and an audio bit stream;

a video decoder which decodes the video bit stream into pixel values of an original picture;

a memory unit with a plurality of line memories which stores input video data in one of the line memories;

a filter coefficient table storing filter coefficients;

a switch which moves positions of filter coefficients selected from the filter coefficient table to corresponding positions of the video data items;

a filter which respectively multiplies the video data items from the memory unit by the filter coefficients input to corresponding positions of the video data items, and adds the multiplied results to output format converted data; and a controller which controls selection of the filter coefficients, the storage of the input data in the plurality of line memories and the movement of the filter coeffients by the switch, based upon a format of a display device.

19. An apparatus of claim 18, wherein the controller generates a control signal which indicates the positions of the video data items including a line memory which stores the center data item of the input video data currently being processed, and the switch moves positions of the filter coefficients according to the control signal.

20. An apparatus of claim 19, wherein the filter mutiplies the video data items by the filter coefficients to interpolate between two video data items if necessary.

* * * * *